March 3, 1959   F. J. MARTIN   2,875,780
SELF-LOCKING REVERSING VALVE
Filed Sept. 28, 1953   2 Sheets-Sheet 1

Frank J. Martin
INVENTOR.

BY *Clarence A. O'Brien*
and *Harvey B. Jacobson*
Attorneys

March 3, 1959

F. J. MARTIN 2,875,780

SELF-LOCKING REVERSING VALVE

Filed Sept. 28, 1953

2 Sheets-Sheet 2

Frank J. Martin
INVENTOR.

BY Clarence A. O'Brien
and Harvey B. Jacobson
Attorneys

2,875,780

SELF-LOCKING REVERSING VALVE

Frank J. Martin, Miami, Fla.

Application September 28, 1953, Serial No. 382,615

3 Claims. (Cl. 137—599.1)

This invention relates to a self-locking reversing valve and particularly to a self-locking reversing valve to be used in a reversible heat pump system.

In the operation of reversible heat pump systems, it is desirable to be able to reverse the flow of refrigerant fluid from the compressor through the working circuit. This has heretofore been accomplished by means of a plurality of valve systems operable to connect the pressure outlet port of the compressor to either end of the work system and a second series of valves operable to connect the return end of the work system to the suction end of the compressor.

The present invention provides a valve which is magnetically operated to reverse the flow through one portion of the valve with the remaining portion of the valve being automatically moved to position by the operation of the first, and both sections of the valve being self-seated by the pressure in the system.

This is accomplished by means of a pair of elongated valve chambers with the valve operating mechanism of the first valve comprising spaced apart valve seats with an inlet between the valve seats and a magnetic valve body and magnetic means for shifting the valve body into contact with either of the valve seats, and a pressure inlet being so positioned with respect to the valve seat that the pressure maintains the valve body in contact with the seat. The outlet ports of the first valve chamber being communicated to the ends of the second valve chamber, and an outlet port is made intermediate the ends of the second valve chamber with control valve seats between the inlet ports and the outlet port and a pressure responsive system for seating the valve therein.

It is accordingly an object of the invention to provide an improved reversing valve.

It is a further object of the invention to provide a magnetically controlled reversing valve.

It is a further object of the invention to provide a self-locking reversing valve.

It is a further object of the invention to provide a reversible heat pump using a reversible valve according to the invention.

Figure 1:
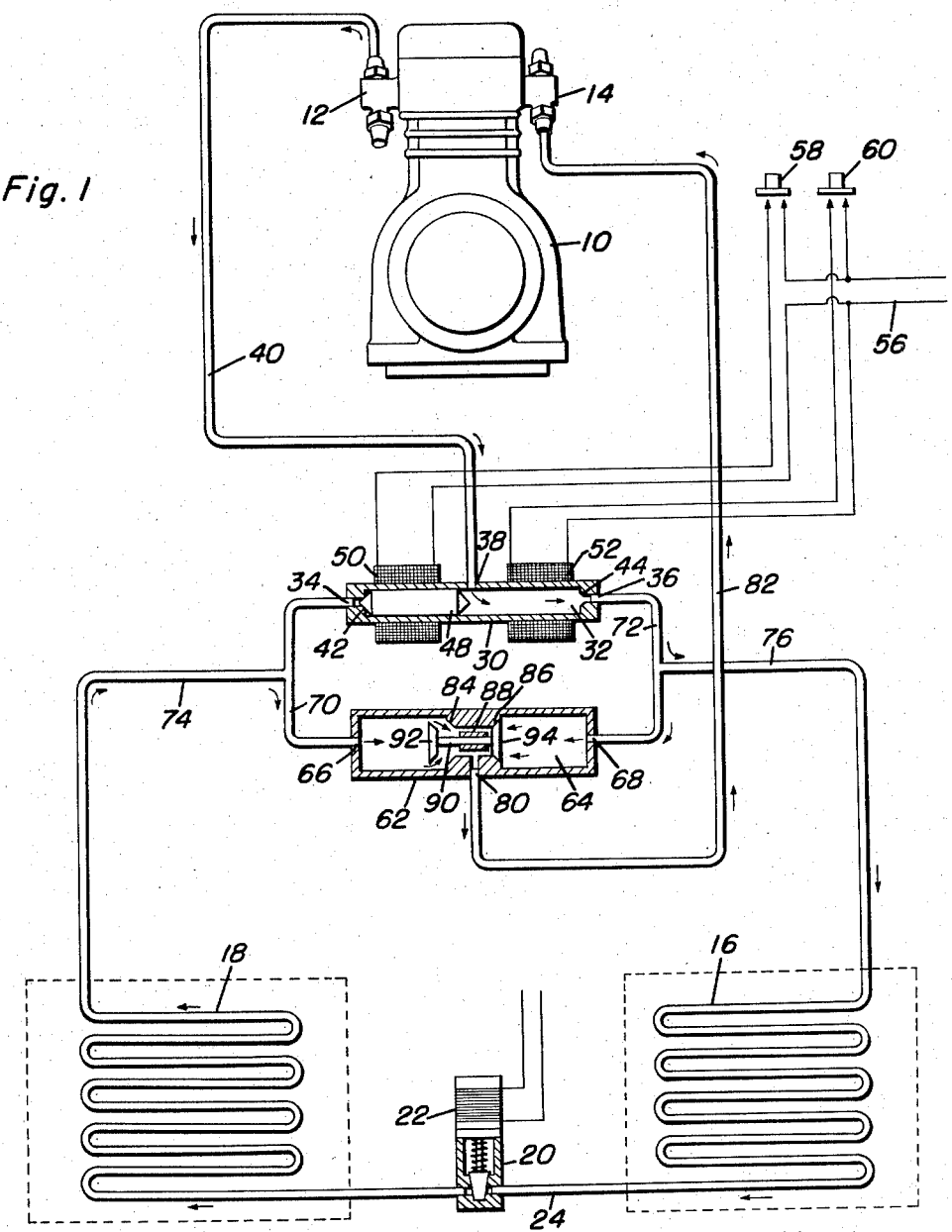
Figure 2:
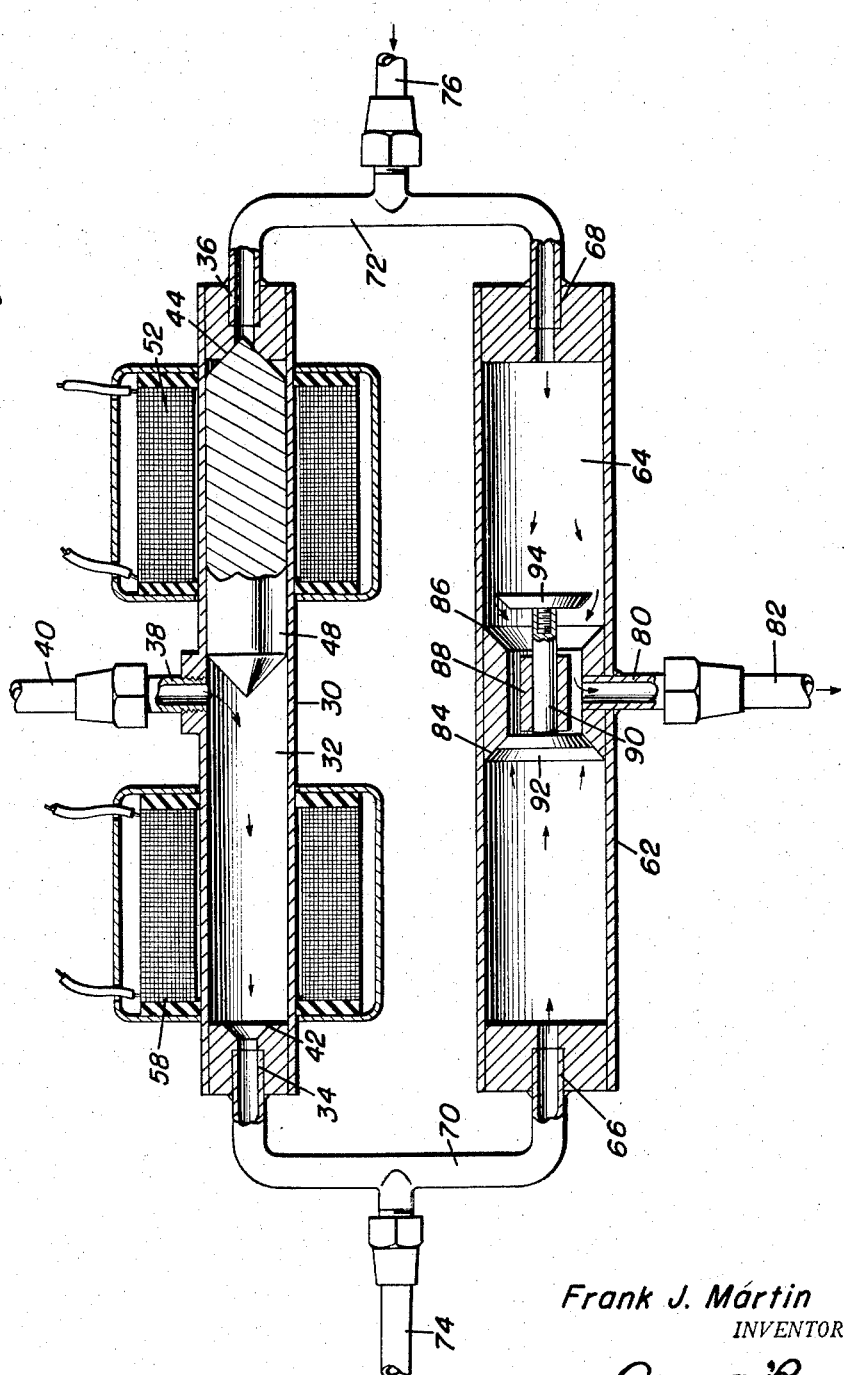

Other objects and many of the attendant advantages of the present invention will be apparent from the following detailed description taken in conjunction with the accompanying drawing in which:

Figure 1 is schematic diagram of a reversible heat system utilizing the reversing valve according to the invention; and Figure 2 is a sectional elevation of the reversing valve according to the invention.

In the exemplary embodiment according to the invention, a compressor 10 is provided with an outlet or pressure port 12 and an inlet or suction port 14. The reversing heat pump system has a pair of coils 16 and 18 which are substantially identical in construction and either of the coils 16 or 18 may be either a condenser or an evaporator. A valve 20 is placed between the coils 16 and 18 and is preferably provided with a magnetic actuating coil 22 which may be operated in response to any desired condition to control the amount of flow through the conduit 24 connecting the coils 16 and 18 in series conducting relation.

The reversing valve proper comprises a first tubular member 30 having an elongated valve chamber 32 therein. An outlet port 34 is provided in one end of the chamber, and an outlet port 36 is provided in the opposite end of the chamber. A pressure inlet port 38 is provided in the body 30 and communicates with the chamber 32 intermediate the outlet ports 34 and 36. A pressure conduit 40 connects the pressure port 12 with the inlet port 38 of the chamber 32. A valve seat 42 is provided adjacent the outlet port 34 and a valve seat 44 is provided adjacent the outlet port 36 and a valve element 48 is slidable in the chamber 32. The valve element 48 is of a length sufficient that it can be retained between either of the valve seats 42 and 44 the inlet port 38.

The actuating system for the valve member 48 comprises a first solenoid 50 and a second solenoid 52 arranged on opposite ends of the valve body 30 and the valve member 48 is constructed of magnetic material. The opposite ends of the valve member 48 are shaped for seating on the valve seats 42 and 44, respectively, and since the valve member 48 is interposed between the seat and the inlet 38, the pressure through the conduit 40 and the inlet 38 will maintain the member 48 firmly seated on whichever seat 42 or 44 it contacts. An electric circuit 56 is provided with a switch 58 and a switch 60 for selectively controlling the energization of the solenoids 50 and 52, respectively. A return portion of the valve comprises an elongated body member 62 having an elongated chamber 64 therein. Inlet ports 66 and 68 are arranged in opposite ends of the chamber 64. A conduit 70 communicates the outlet port 34 with the inlet port 66 so that the similar ends of the chambers 32 and 64 are connected together. Likewise, the conduit 72 connects the outlet port 36 with the inlet port 68.

The conduit 70 is adapted to be connected to the conduit 74 of the reversible working circuit, while the conduit 72 is connected to the opposite terminal 76 of the reversible working circuit including the coils 16 and 18 and the series connecting conduit 24.

An outlet port 80 is provided adjacent the central portion of the body 62 and is connected to the suction terminal 14 of the compressor by means of the conduit 82.

A valve seat 84 is provided between the inlet port 66 and the outlet port 80 and a similar valve seat 86 is provided between the inlet port 68 and the outlet port 80. A valve guide bearing 88 is mounted in the space between the valve seats 84 and 86 and a valve rod 90 is slidably mounted in the bearing 88 and the valve heads 92 and 94 are mounted on opposite ends of the rod 90.

In the operation of the device according to the invention, the compressor 10 will be put in motion to supply pressure through the conduit 40 into the chamber 32 and one or the other of the solenoids 50 or 52 will be energized by momentarily closing a switch 58 or 60 so that the valve element 48 will be selectively engaged with one of the seats 42 or 44. The pressure from the conduit 40 will press against the valve element 48 and cause the end thereof to be firmly seated in the valve seat 42 or 44, whichever is selected. The pressure in the chamber 32 will then be delivered through the open port herein shown in Figure 1 as the right hand port so that the pressure will go through conduit 72 into the chamber 64 and press against the valve head 94 and cause it to seat in the valve seat 86. This effectively closes the communication between the inlet 68 and the outlet 80 so that the fluid under pressure must go through the conduit 76 and the coils 16 and 18 back to the conduit 74 through the inlet 66 and out through the valve seat 84 to the outlet port 80 and through the conduit 82 back to the compressor 10.

The actual flow of fluid through the working circuit will be controlled by the valve 20, as is well understood in the art. As is well known, the coil 16 will receive the compressed fluid from the compressor 10 and will give off heat to condense the compressed fluid to a liquid when it will flow through the control valve 20 into the coil 18 where it will be evaporated to absorb heat so that the space about the coil 16 will be heated, while the space about the coil 18 will be cooled.

When it is desired to reverse the direction of heat flow, the solenoid 52 is energized moving the member 48 into contact with the seat 44 and reversing the flow of fluid, causing the valve head 92 to seat on the seat 84 and forcing the fluid to go through conduit 74 utilizing the coil 18 as the condenser and coil 16 as the evaporator and returning through conduit 76 and flowing out through valve seat 86 into the outlet 80 and through the conduit 82 back to the compressor.

It will thus be seen that the reversing valve reverses the flow of fluid through the working circuit without disturbing the flow of fluid through the compressor. As soon as the direction of flow has been initiated, the valve will move forward and seal itself into position to complete the flow according to the selected arrangement.

It will thus be seen that the present invention provides a convenient reversing valve having a magnetic actuating mechanism for initiating the device, after which the operation completes itself automatically and locks itself into position.

For simplicity of explanation, a particular embodiment of the invention has been shown and described according to the best present understanding thereof. However, it will be apparent to those skilled in the art that many changes and modifications may be made in the construction and arrangement of the parts thereof without departing from the true spirit of the invention.

What is claimed as new is as follows:

1. Reversing valve apparatus for use with combined cooling and heating systems comprising, in combination, a first valve chamber, a first valve body movably mounted within said first chamber, a pair of spaced-apart valve ports for said first chamber and each including associated valve seats selectively engageable by said first valve body, control means for moving said first valve body into engagement with one or the other of said first pair of valve seats, a second valve chamber, said second chamber being tubular in shape and having an opening adjacent each end thereof, a second pair of valve seats longitudinally spaced-apart within said second chamber between said openings, an internal longitudinal passageway joining said second pair of valve seats, a second valve body mounted for free movement within said passageway and extending out through said valve seats, said second valve body including valve heads at the ends thereof, each of said valve heads being between the corresponding valve seat and the corresponding one of said second chamber openings so that the application of fluid pressure to either of said second chamber openings forces the corresponding valve head into engagement with its valve seat, a supply conduit connected to the interior of said first chamber, a return conduit connected to the interior of said passageway, first pressure transmitting means for establishing communication between one of said first chamber ports and the opening in one end of said second chamber, second pressure transmitting means for establishing communication between the other of said first chamber ports and the opening in the other end of said second chamber, and a pair of load conduits connected respectively to said first and second pressure transmitting means.

2. Reversing valve apparatus for use with combined cooling and heating systems comprising, in combination, a first valve chamber, a first valve body movably mounted with respect to said first chamber, first and second spaced-apart valve ports for said first chamber, a first pair of valve seats for said ports respectively and selectively engageable by said first valve body, control means for moving said first valve body into engagement with one or the other of said first pair of valve seats, a second valve chamber, said second chamber being tubular in shape and having first and second openings at the respective ends thereof, a second pair of valve seats longitudinally spaced-apart within said second chamber, an internal passageway joining said second pair of valve seats, a second valve body including a rod mounted for free movement within and guided by said passageway, said second valve body having valve heads mounted on the ends of said rod and outside of said passageway, said heads being disc-shaped with a diameter slightly less than the inner diameter of said second chamber so that the application of fluid pressure to either of said second chamber openings forces the corresponding valve head into engagement with its valve seat, a supply conduit connected to the interior of said first chamber, a return conduit connected to the interior of said passageway, first pressure transmitting means for establishing communication between one of said first chamber ports and the opening in one end of said second chamber, second pressure transmitting means for establishing a communication between the other of said first chamber ports and the opening in the other end of said second chamber, and a pair of load conduits connected respectively to said first and second pressure transmitting means.

3. Reversing valve apparatus for use with combined cooling and heating systems comprising, in combination, a first tubular valve chamber, a first valve body comprising an elongated tubular member slidably mounted within said first chamber, first and second valve ports at the opposite ends of said first chamber respectively and each including associated valve seats selectively engageable by said first valve body, control means for moving said first valve body into engagement with one or the other of said first pair of valve seats, a second tubular valve chamber having an opening at each end thereof, a second pair of valve seats longitudinally spaced-apart within said second chamber and interiorly of said openings, an internal passageway joining said second pair of valve seats, a second valve body comprising a valve rod mounted for free movement within said passageway and extending out through said valve seats, said valve rod having valve heads at the ends thereof outside of said passageway so that the application of external fluid pressure to either of said second chamber openings forces the corresponding valve head into engagement with its valve seat, a supply conduit connected to an opening through the side wall of said first chamber, the distance between said first chamber opening and either of said ports being greater than the length of said tubular member, a return conduit connected to the interior of said passageway, first pressure transmitting means for establishing communication between one of said first chamber ports and one of said second chamber openings, second pressure transmitting means for establishing communication between the other of said first chamber ports and the other of said second chamber openings, and a pair of load conduits connected respectively to said first and second pressure transmitting means.

References Cited in the file of this patent

UNITED STATES PATENTS

| | | |
|---|---|---|
| 322,388 | Lord | July 14, 1885 |
| 1,235,980 | Keyes | Aug. 7, 1917 |
| 1,640,537 | Dean | Aug. 30, 1927 |
| 2,366,412 | Lambert | Jan. 2, 1945 |
| 2,634,086 | Johns | Apr. 7, 1953 |
| 2,654,227 | Muffly | Oct. 6, 1953 |